(12) United States Patent
Fischer

(10) Patent No.: US 6,540,186 B1
(45) Date of Patent: Apr. 1, 2003

(54) ANCHOR DEVICE

(76) Inventor: David Scott Fischer, 501 Davis Rd., #E-206, League City, TX (US) 77573

( * ) Notice: Subject to any disclaimer, the term of this patent is extended or adjusted under 35 U.S.C. 154(b) by 145 days.

(21) Appl. No.: 09/651,974

(22) Filed: Aug. 31, 2000

(51) Int. Cl.[7] .................................................. A44B 1/18
(52) U.S. Cl. ..................... 248/205.2; 248/300; 248/500
(58) Field of Search ............................... 248/205.2, 500, 248/505, 300

(56) References Cited

U.S. PATENT DOCUMENTS 3,182,807 A * 5/1965 Root ...................... 248/300 X
3,638,892 A * 2/1972 Boye et al. ................. 248/300
4,417,710 A * 11/1983 Adair ................... 248/205.2 X
4,854,037 A * 8/1989 DeSanto .............. 248/205.2 X
5,897,086 A * 4/1999 Condon ................. 248/300 X

* cited by examiner

Primary Examiner—Ramon O. Ramirez
(74) Attorney, Agent, or Firm—Bill B. Berryhill

(57) ABSTRACT

An anchor device comprising an elongated flat plate having an upper face, a lower face and two ends, at least one of the ends being engageable with a connecting member for attaching the device to the object. A sheet of hooked fabric is affixed to the lower face.

5 Claims, 1 Drawing Sheet

ANCHOR DEVICE

BACKGROUND OF THE INVENTION

1. Field of the Invention

The present invention pertains to anchor devices. More specifically, the present invention pertains a device suitable for temporary attachment to any object to which tension may be applied. In particular, the present invention pertains to an anchor device suitable for temporarily anchoring a parachute container so that tension may be applied to the container while parachute lines are pulled and straightened.

2. Description of the Prior Art

Parachutes are folded and packed in a parachute container which is then placed on the parachutist with leg straps, shoulder straps, harnesses and the like prior to parachuting from an airplane. Although parachutes were developed primarily for emergency escape from disabled aircraft, parachuting has become very popular as a sport with some persons. For both emergency use and recreational use, it is desirable for the parachute to be repacked, after deployment and landing, for reuse thereafter. It is very important, that the chute canopy and the lines by which is attached to the user be properly packed. To repack a chute, it is important that the lines be pulled, straightened and placed in tension for the purpose of straightening and sorting the lines prior to packing.

In the past, the parachute container has been anchored so that tension may be applied to the parachute lines by placing one or more heavy objects therein. such objects may include jugs of water, sand bags, steel weights, etc. In some cases, the container may be tied to a tree or pole. However, these types of anchor objects are not always available.

SUMMARY OF THE PRESENT INVENTION

The present invention provides an anchor device for temporary attachment to any object to which tension may be applied. It is, however, specifically designed for temporarily anchoring a parachute container so that tension may be applied to the parachute container while parachute lines are pulled and straightened.

The anchor device of the present invention comprises an elongated flat plate having upper and lower faces and two ends. In a preferred embodiment one of the ends is provided with a slot through which a strap may be inserted for attaching the anchor device to a parachute container.

A sheet of hooked fabric is affixed to the lower face of the flat plate for engagement with corresponding looped fabric (such as a carpet) to anchor the parachute container thereto. Most facilities utilized in repacking both emergency and recreational parachutes are provided with carpets of the looped fabric type. The hooked fabric of the anchor device and the looped fabric of the carpet are easily engageable. A slot or other means is provided on one end of the plate so that a strap may be connected thereto and to the parachute container. This allows tension to be placed on the parachute container while the parachute lines are pulled and straightened. Variations of the anchor device are described herein.

Thus, the device of the present invention provides a means of temporarily anchoring a parachute container while the parachute lines are pulled and straightened for repacking thereof. The device is effective and simple to manufacture and use. While it is primarily for anchoring a parachute container during repacking thereof, it can be used for temporarily anchoring any object to which tension may be applied. Many other objects and advantages of the invention will be apparent from a description of the invention which follows in conjunction with the accompanying drawings.

DESCRIPTION OF A PREFERRED EMBODIMENT

Figure 1:
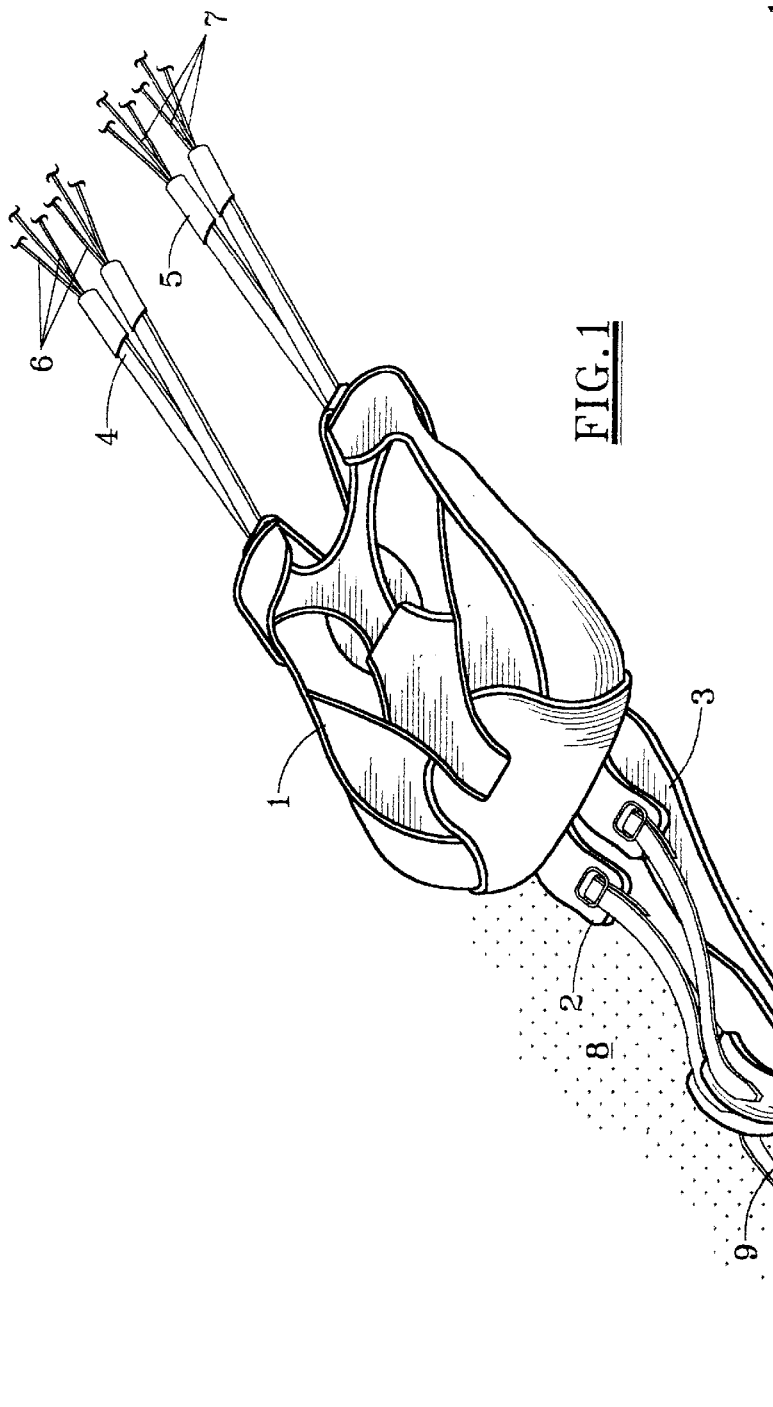
FIG. 1 is a pictorial illustration of a parachute container, with other portions of the parachute attached thereto, shown attached to an anchor device for placing tension thereon, according to a preferred embodiment of the invention.

Referring first to FIG. 1 there is shown a parachute container 1 at one end of which are leg straps 2 and 3 and at the opposite ends of which are risers 4, 5 and lines 6, 7 which are attached to the canopy portion (not shown) of a parachute. The parachute container 1 is shown resting on a horizontal surface 8 which typically would be looped fabric carpet. A strap 9 connects the leg straps 2, 3 of the parachute to an anchor device 10 which also rests on the looped fabric 8.

Figure 2:
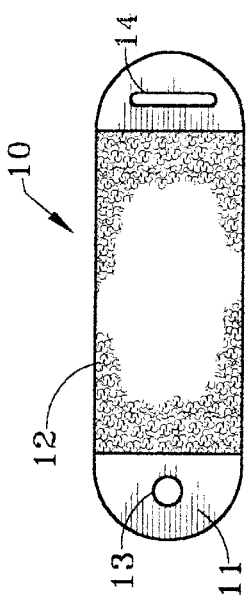
FIG. 2 is a bottom view of the anchor device of the present invention, according to a preferred embodiment thereof.
Figure 3:
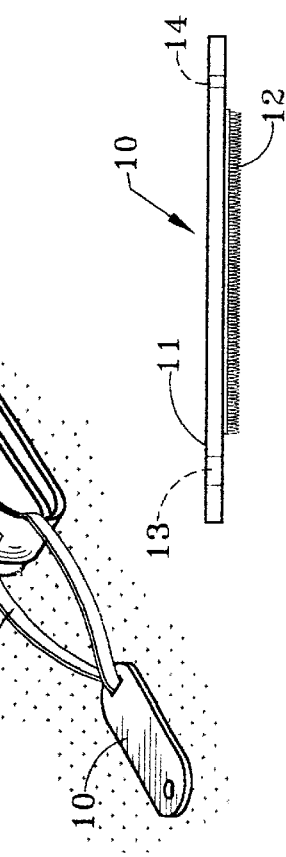
FIG. 3 is an edge view of the anchor device of the present invention, according to a preferred embodiment thereof.

As been seen in FIGS. 2 and 3, the anchor device 10 comprises a flat plate 11 having an upper face, a lower face and two ends. The plate 11 is preferably of stainless steel. Attached to the lower face of the steel plate 11 is a sheet of hooked fabric 12. A particularly desirable fabric for this use is manufactured by the DuPont Company under the trademark Velcro (HTH hook 24). The hooked fabric may be attached to the lower face of the plate 11 with pressure sensitive adhesive or any other suitable means.

One end of the plate 10 has an aperture 13 therein and the opposite end has a slot 14. As illustrated in FIG. 1, the strap 9 may be inserted through the slot 14 and temporarily attached to the parachute container 1 by looping the strap 9 through the leg straps 2 and 3 or any other suitable portion of the chute.

After the parachute, of which the container 1 is a part, has been deployed, the anchor plate 10 may be temporarily attached thereto by the strap 9, the hooked fabric 12 on the lower face of the anchor 10 engaging the corresponding looped fabric of the carpet 8. With the engagement of the corresponding hooked and looped fabrics, the anchor device 10 serves as an anchor for the parachute container 1, the risers 4, 5 and the lines 6, 7 attached thereto. The lines 6, 7 may be pulled and straightened while the anchor device 10 allows tension to be placed on the lines for straightening and sorting thereof. After the canopy and the lines are straightened, the parachute is refolded and packed in the container 1. Then the parachute container 1 and the repacked parachute can be released from the anchor 10.

The aperture 13 at the opposite end of the plate 11 may be used for storing a pull-up cord or connecting an additional fastener or securing the plate 10 to another type of surface, such as inserting a spike through the aperture 13 to attach the plate to the ground in the case of outdoor use on grass or dirt surfaces.

A single embodiment of the anchor device of the present invention has been described herein. Many variations thereof can be made without departing from the spirit of the invention. Accordingly, it is intended that the scope of the invention be limited only by the claims which follow.

What is claimed is:

1. An anchor device for temporarily anchoring a parachute container to a surface covered with looped fabric, said device comprising, in combination: an elongated flat plate having upper and lower faces and two ends one of which has a slot therein, a sheet of hooked fabric affixed to said lower face of said plate and a strap inserted through said plate slot, said hooked fabric being selectively engageable with said looped fabric covered surface and said strap being temporarily attachable to said parachute container, allowing tension to be applied to said anchored parachute container while parachute lines thereof are pulled and straightened.

2. An anchor device as set forth in claim 1 in which said plate is metallic.

3. An anchor device as set forth in claim 1 in which said plate is stainless steel.

4. An anchor device as set forth in claim 1 in which the other end of said plate has an aperture therethrough.

5. An anchor device as set forth in claim 1 in which said hooked fabric is affixed to said plate by pressure sensitive adhesive.

* * * * *